United States Patent [19]
Volkmann et al.

[11] Patent Number: 5,752,740
[45] Date of Patent: May 19, 1998

[54] MOTOR VEHICLE ARMREST WITH STORAGE SPACE

[75] Inventors: Tilo Volkmann; Juergen Koerber, both of Sindelfingen, Germany

[73] Assignee: Mercedes-Benz AG, Germany

[21] Appl. No.: 673,087

[22] Filed: Jul. 1, 1996

[30] Foreign Application Priority Data

Jul. 3, 1995 [DE] Germany .................. 195 24 177.0

[51] Int. Cl.⁶ .......................................... A47C 7/62
[52] U.S. Cl. .................. 297/188.19; 297/217.4; 297/411.2
[58] Field of Search ............. 297/411.2, 217.4, 297/217.3, 217.1, 188.19, 188.14, 188.01; 224/275

[56] References Cited

U.S. PATENT DOCUMENTS

| | | | |
|---|---|---|---|
| 1,490,538 | 4/1924 | Owen | 297/188.19 X |
| 2,797,739 | 7/1957 | Orsini | 297/188.19 X |
| 3,237,824 | 3/1966 | Gunckel | 297/188.01 X |
| 3,951,448 | 4/1976 | Hawie | 297/188.19 X |
| 4,868,888 | 9/1989 | Dayton | 297/217.4 X |
| 5,390,976 | 2/1995 | Doughty et al. | 297/188.19 X |
| 5,494,329 | 2/1996 | Gonzalez et al. | 297/184.13 |
| 5,556,017 | 9/1996 | Troy | 297/188.01 X |
| 5,562,331 | 10/1996 | Spykerman et al. | 297/188.19 X |

FOREIGN PATENT DOCUMENTS

| | | | |
|---|---|---|---|
| 2545308 | 4/1977 | Germany | 224/275 |
| 42 20 670 A1 | 1/1994 | Germany | |
| 42 30 242 A1 | 3/1994 | Germany | |

*Primary Examiner*—Milton Nelson, Jr.
*Attorney, Agent, or Firm*—Evenson, McKeown, Edwards & Lenahan, P.L.L.C

[57] ABSTRACT

An armrest for vehicles has a basic body constructed with an upwardly open receiving compartment and a closing flap which covers the receiving compartment. The closing flap is swivellably held on the basic body and has an arm supporting padding and a depositing compartment. For making the depositing tray accessible from the rear seat of the vehicle between the backrests of the two front seats, with a low-cost manufacture and an attractive appearance of the armrest, the arm padding support is provided with a central opening. A sliding blind which covers the depositing tray is longitudinally slidably guided in the closing flap.

20 Claims, 4 Drawing Sheets

MOTOR VEHICLE ARMREST WITH STORAGE SPACE

BACKGROUND AND SUMMARY OF THE INVENTION

The present invention relates to an armrest for vehicles, and more particularly, to an armrest arranged between front seats of the vehicle, comprising a basic body configured as an upwardly open receiving compartment, a closing flap configured and arranged to cover the receiving compartment, the closing flap being operatively associated with the basic body so as to be swivellable about a swivel shaft aligned transversely with respect to a longitudinal axis of the basic body, an arm supporting padding provided at the closing flap, and a depositing area which is accessible from above the armrest.

DE 42 30 242 A1 describes an armrest having a closing flap which can be lockably fixed on the basic body by a first lock and constructed in two parts. A flap body contains the tray and a cover which covers the tray and has an arm supporting padding fastened thereon. The cover is swivellably held on the swivel shaft of the closing flap and can be fixed to the flap body by a second lock.

For opening the lower receiving compartment in this known armrest, after the release of the first lock, the closing flap must be swivelled by 90° about its swivel shaft. The second lock remains active so that the tray remains closed. For the opening-up of the tray, the second lock must be released, and the cover with the arm supporting padding must be swivelled up by 90°.

With respect to manufacturing techniques, such a multi-part construction of the closing flap with its different swivel and locking mechanisms is not very advantageous and, when arranged between the front seats of a motor vehicle, hinders the access to the open tray from the rear seat because, during the opening of the tray, the cover with the arm supporting padding swivels toward the rear.

DE 42 20 670 A1 shows a closable receptacle for accommodating a car telephone which, for the purpose of providing an attractive design of its cover, is covered by a sliding blind which can be displaced in the longitudinal direction of the receptacle. The receptacle is integrated in a covering which extends from the center console below the dashboard to the armrest, and is therefore arranged in front of the armrest. For this purpose, additional installation space must be provided in the vehicle. Because of this arrangement of the closable receptacle, the car telephone is accessible to the driver or front seat passenger but cannot be used from the rear seat without the driver's or front seat passenger's help.

It is an object of the present invention to improve an armrest of the known type by providing two integrated, separately accessible storage spaces as well as an unimpaired arm supporting function. Thereby, while an attractive appearance is maintained, on the one hand, a manufacturing operation is simplified. Also, the accessibility of the upper depositing tray from the rear seat of the vehicle is advantageously ensured without any hindrances.

The foregoing object has been achieved in accordance with the present invention by providing that accessibility of the depositing area is provided by a central opening in the padding and a sliding blind is longitudinally slidably guided in the closing flap which covers the depositing area.

The armrest according to the present invention has the advantage that the closing flap is in one piece and, together with the integrated tray, can be produced as a molded plastic part which is advantageous with respect to a manufacturing operation therefor. An additional locking mechanism for the connection of the tray and the supporting padding during the swivelling of the closing flap for opening the lower receiving compartment is unnecessary. By way of the sliding blind, the tray can be covered in a lockable manner. After the sliding blind is pushed away for exposing the tray, no parts swivelled away from the armrest hinder the access to the tray from the rear seats of the motor vehicle between the backrests of the front seats.

When, according to a presently preferred embodiment of the invention, the depositing compartment is equipped with at least the handpiece of a car telephone, the depositing compartment is brought into a position by swivelling up the closing flap. This arrangement is extremely favorable for access from the rear seats because the depositing compartment can be conveniently opened by persons occupying the rear seat and the handpiece can be removed for making a phone call. The armrest according to the invention is therefore particularly suitable for chauffeur-driven vehicles, in that it accommodates the car telephone which is essentially used from the rear seat bench in those types of vehicles.

The closed sliding blind for the depositing compartment itself presents an attractive appearance of the armrest which can also be influenced by that fact that, according to another presently contemplated embodiment of the present invention, the siding blind may be arranged flush with the supporting padding or sunk with respect to the supporting padding. The lateral guides for the sliding blind, like the tray, are molded on during the manufacturing operation of the closing flap and are covered by the arm supporting padding in an invisible manner.

The supporting surface of the supporting padding remaining around the opening is sufficient for ensuring a comfortable arm support for the driver and/or the front seat passenger. The supporting surface of the supporting padding can be adapted to the manufacturer's ideas without any problems. Thus, according to different embodiments of the present invention, the material cross-sections of the supporting padding remaining on both sides of the depositing openings can have equal or different dimensions and/or may be constructed to reach over the depositing compartment and the sliding blind on both longitudinal sides to an equal of different extent in order to provide, for example, for the driver and front seat passenger, an equally sufficiently wide support or only an arm support for the driver or for the front seat passenger.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
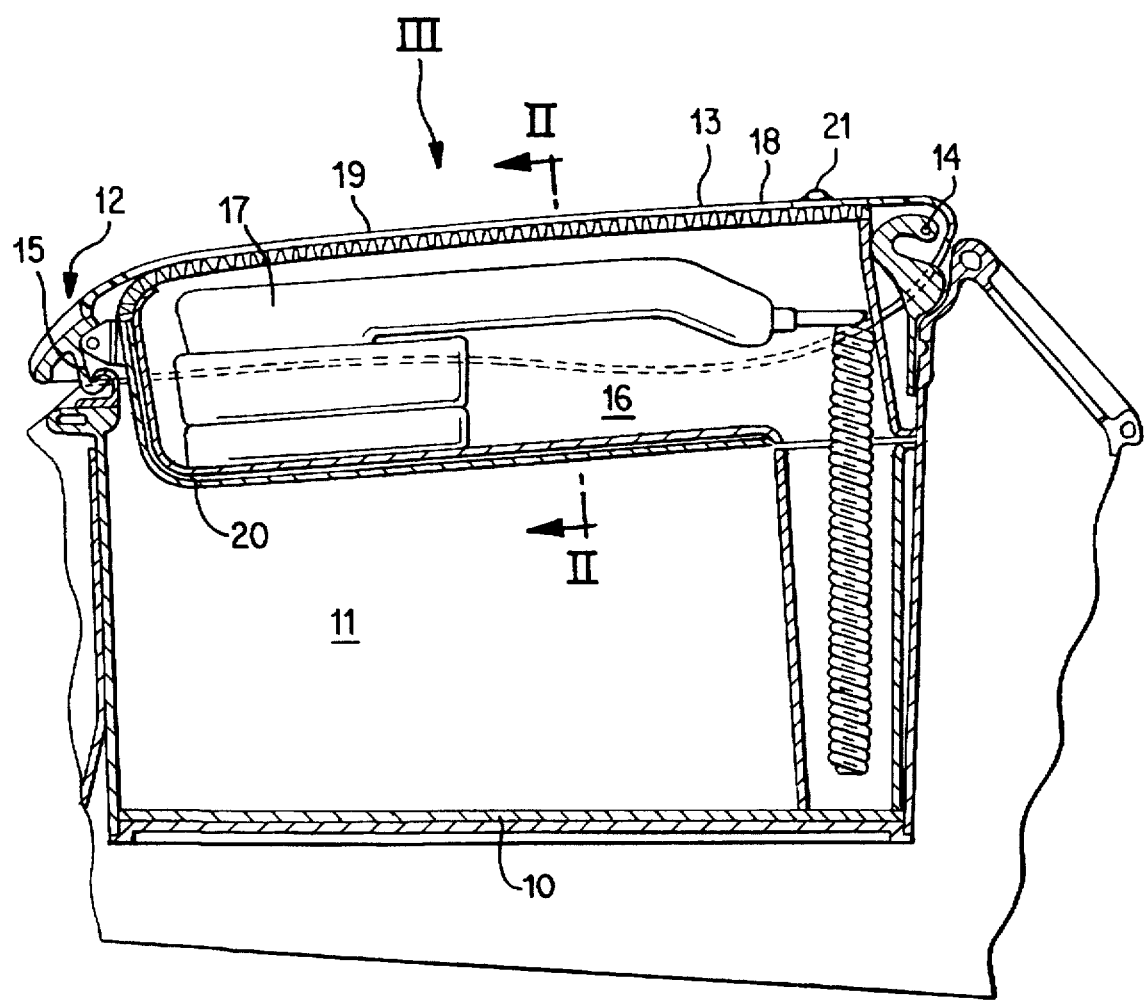
FIG. 1 is a longitudinal sectional view along line I—I in FIG. 3 of an armrest in accordance with the present invention for a vehicle.

The armrest illustrated in FIG. 1 is provided for the firm mounting on the center console between the two front seats of a passenger car in a generally known manner. The armrest has a basic body 10 with an integrated receiving compartment 11 and a closing flap 12 with an arm supporting padding 13 arranged thereon. The closing flap 12, which is constructed for covering the receiving compartment 11, is arranged to be swivelled transversely to the longitudinal axis of the armrest about a swivel shaft 14 held on the rearward end of and inside the basic body 10. On the forward end of the closing flap 12, which is away from the swivel shaft 14, a locking arrangement 15 is provided by way of which the closing flap 12 can be lockably latched on the basic body 10.

In the closing flap 12, a depositing compartment 16 is integrated in which the earpiece and the handpiece 17 of a car telephone can be placed so that it can be taken out. The access to the depositing compartment 15 and therefore to the handpiece 17 of the car telephone is permitted by an elongated central opening 18 which is provided in the arm supporting padding 13 and which can be closed by a sliding blind 19. The sliding blind 19 is slidably guided in longitudinal rails 20 which project at a right angle on the upper edge of the depositing compartment 16 on mutually opposite longitudinal sides on the interior wall of the depositing compartment 16.

Figure 2:
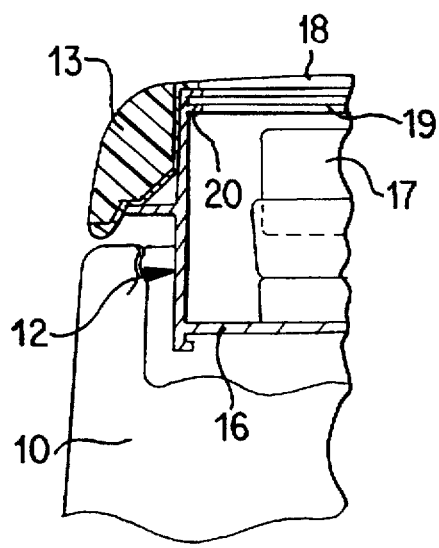
FIG. 2 is a sectional view along line II—II in FIG. 1.

As illustrated in FIG. 2, the inside width of the opening 18 in the padding 13, whose material cross-section is also shown, has approximately the same size as the inside width of the opening of the depositing compartment 16. The longitudinal rails 20 are arranged such that the exterior side of the sliding blind 19 is almost flush with the surface of the padding 13. The padding 13 has an asymmetrical shape and, in the forward half of the armrest, offers a slightly wider arm supporting surface for the front seat passenger. Furthermore, the material cross-section of the padding 13 remaining on both longitudinal sides of the opening 18 has approximately the same dimension.

Figure 4:
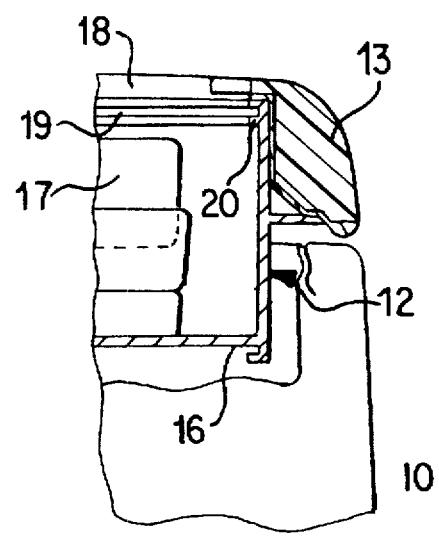
FIG. 4 is a cutout of a cross-section of another embodiment of the armrest according to the present invention also along line II—II in FIG. 1.
Figure 3:
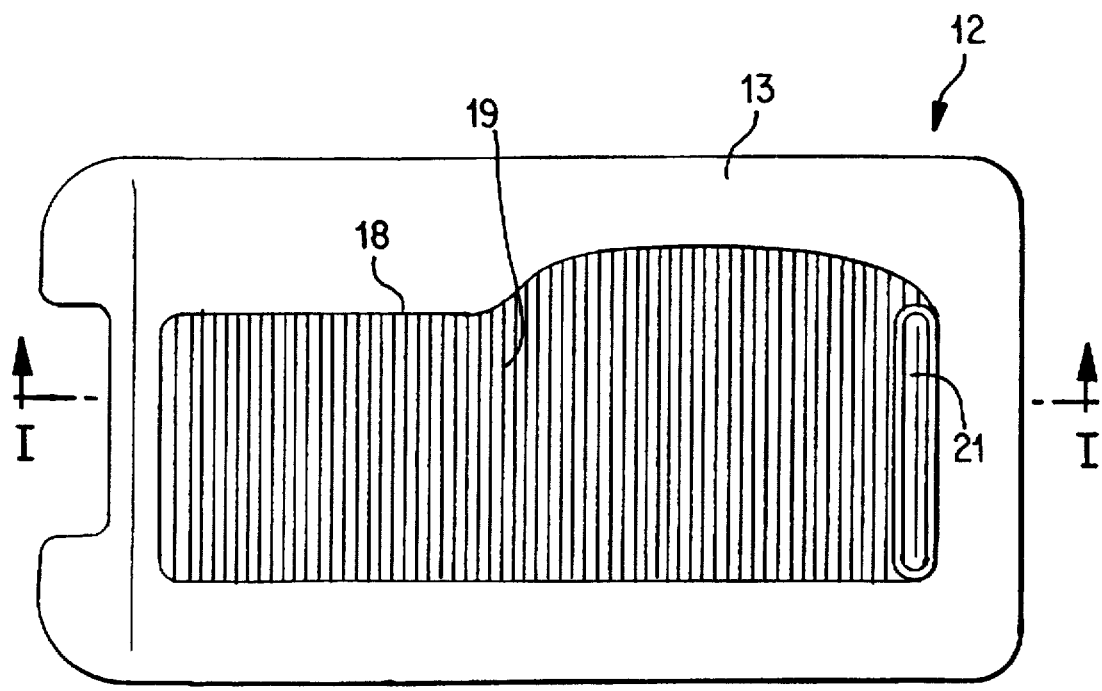
FIG. 3 is a top view of the armrest as viewed in the direction of the arrow III in FIG. 1.

The portion of the modified armrest shown in FIG. 4 in cross section has the sliding blind 19 arranged in a sunken manner and therefore has a larger distance from the surface of the padding 13. On both longitudinal sides of the armrest, the padding 13 reaches over the opening 18 and the sliding blind 19 more or less far so that the inside width of the opening 18 is slightly smaller than that of the depositing compartment 16.

Figure 5:
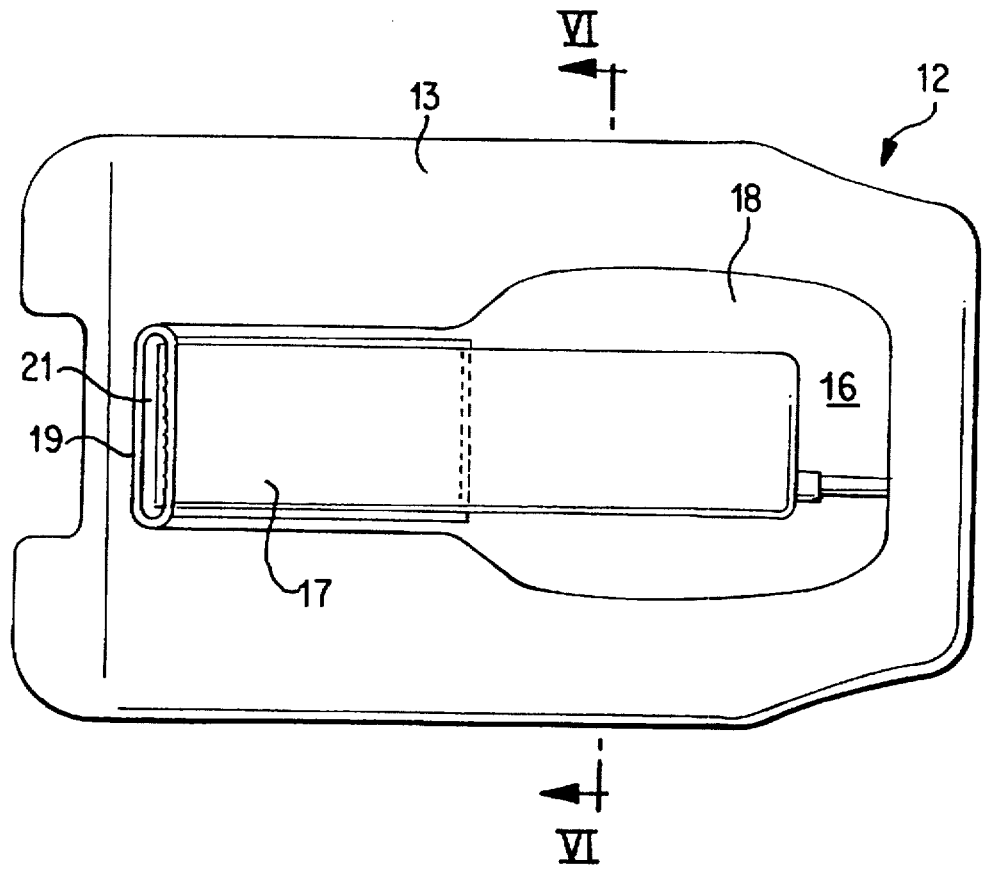
FIG. 5 is a top view as viewed in the direction of arrow III in FIG. 1 of an armrest according to yet another embodiment.
Figure 6:
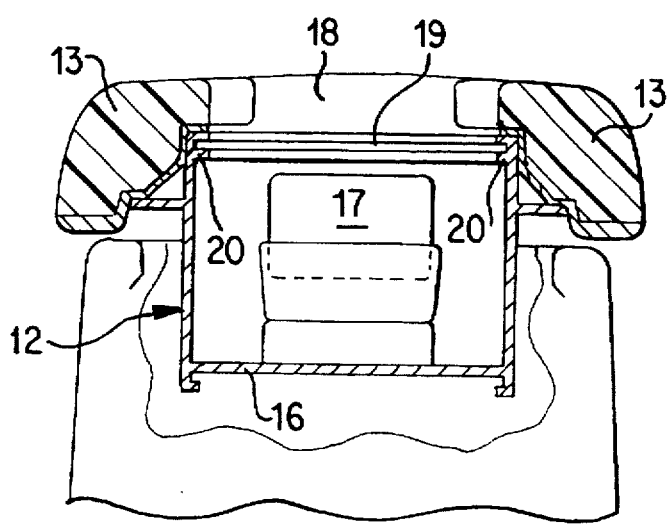
FIG. 6 is a sectional view along line VI—VI in FIG. 5.

In the embodiment of the armrest illustrated in FIG. 5 and in a cross-sectional view in FIG. 6 along line VI—VI in FIG. 5, the sliding blind 19 is arranged at an even larger distance from the surface of the padding 13 in the closing flap 12. The opening 18 in the padding 13 is constructed to be asymmetrical with respect to the longitudinal axis of the armrest and is wider in the rearward half of the armrest than in the forward half. The padding support 13 again reaches on the edge side over the sliding blind 19. The material cross-section of the padding remaining on both longitudinal sides of the armrest 13 is equally large so that the same arm supporting surface adjoins the opening 18 on the driver's side and on the front seat passenger's side.

Figure 7:
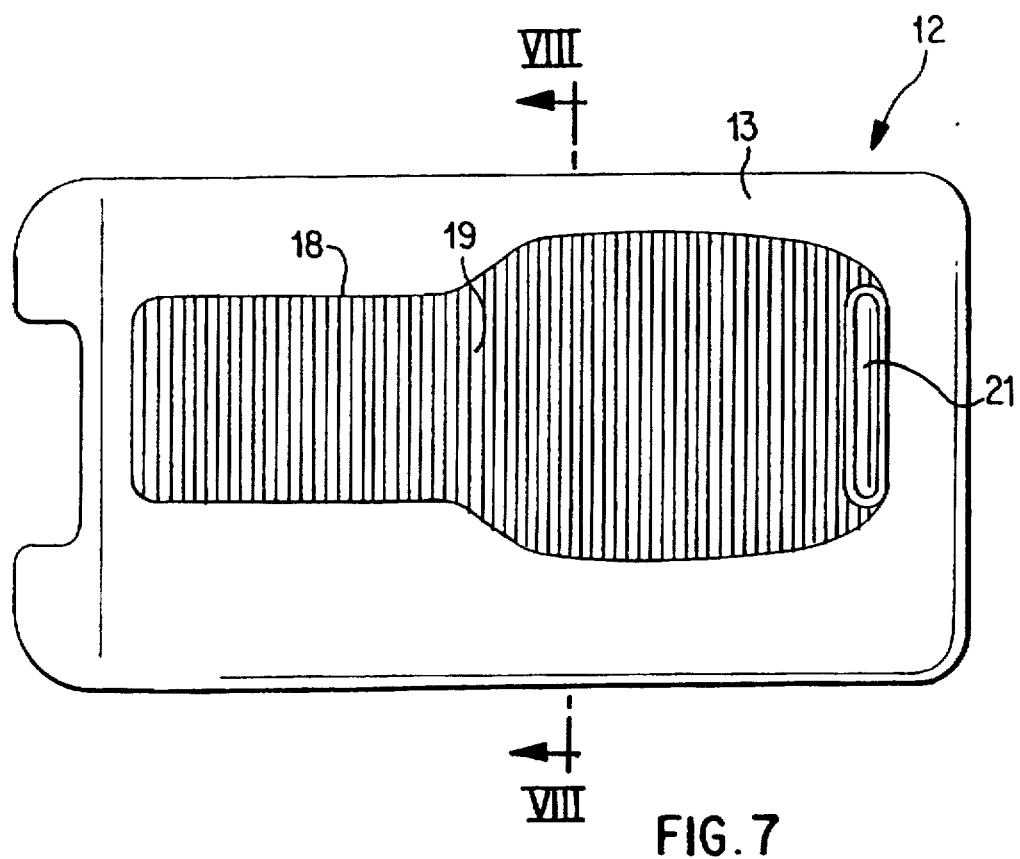
FIG. 7 is a top view as viewed in the direction of the arrow III in FIG. 1 of an armrest according to a yet further embodiment of the armrest of the present invention.
Figure 8:
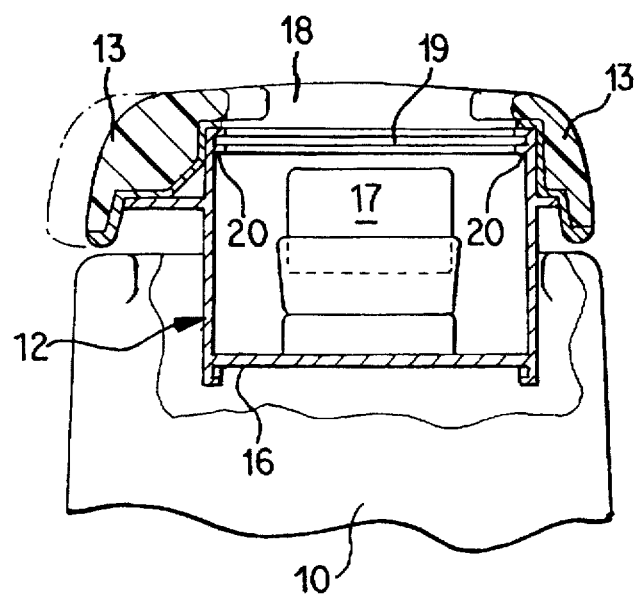
FIG. 8 is a sectional view along line VIII—VIII in FIG. 7.

In the case of the armrest according to the embodiment of the armrest shown in FIGS. 7 and 8, the receiving compartment 11 and the opening 18 in the padding 13 are not arranged symmetrically with respect to the longitudinal axis of the armrest but are offset in the direction of the front seat passenger side relative to the armrest. As a result, on the driver-side longitudinal side of the armrest, there is a wider arm supporting surface of the padding 13. As illustrated in FIG. 8, the material cross-section of the padding 13 on the driver-side longitudinal side is significantly larger than the material cross-section of the padding 13 remaining on the front-passenger-side longitudinal side. The sliding blind 19 is again arranged in a sunken manner with respect to the surface of the padding 13 and, on the edge side, the padding 13 reaches slightly thereover. A grip strip 21 (FIGS. 1, 3, 5 and 7) is fastened to the sliding blind 19 for operating the latter to open and close the depositing compartment 16.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An armrest for a vehicle adapted to be arranged between front seats of the vehicle, comprising a basic body configured as an upwardly open receiving compartment, a closing flap configured and arranged to cover the receiving compartment, the closing flap being operatively associated with the basic body so as to be swivellable about a swivel shaft aligned transversely with respect to a longitudinal axis of the basic body, an arm supporting padding provided at the closing flap, and a depositing area which is accessible from above the armrest, wherein, accessibility of the depositing area is provided by a central opening in the padding and a sliding blind is longitudinally slidably guided in the closing flap which covers the depositing area.

2. The armrest according to claim 1, wherein an inside width of an opening of the depositing area and of the padding opening are approximately equal.

3. The armrest according to claim 2, wherein an exterior side of the sliding blind is flush with an exposed surface of the padding.

4. The armrest according to claim 2, wherein a material cross-section of the padding on one of the longitudinal sides of the padding opening is different from that on another of the longitudinal sides.

5. The armrest according to claim 4, wherein an exterior side of the sliding blind is flush with an exposed surface of the padding.

6. The armrest according to claim 1, wherein the depositing area and the padding opening have an asymmetrical construction with respect to the longitudinal axis.

7. The armrest according to claim 6, wherein an inside width of an opening of the depositing area and of the padding opening are approximately equal.

8. The armrest according to claim 7, wherein an exterior side of the sliding blind is flush with an exposed surface of the padding.

9. The armrest according to claim 6, wherein an inside width of the padding opening is smaller than an inside width of an opening of the depositing area.

10. The armrest according to claim 9, wherein the sliding blind is arranged in a sunken manner at a distance from an exposed surface of the padding.

11. The armrest according to claim 1, wherein an inside width of the padding opening is smaller than an inside width of an opening of the depositing area.

12. The armrest according to claim 11, wherein the sliding blind is arranged in a sunken manner at a distance from an exposed surface of the padding.

13. The armrest according to claim 1, wherein the swivel shaft is arranged at the rearward end of the basic body, and at least a car telephone handpiece is removably held in the depositing area.

14. The armrest according to claim 13, wherein an inside width of an opening of the depositing area and of the padding opening are approximately equal.

15. The armrest according to claim 14, wherein an exterior side of the sliding blind is flush with an exposed surface of the padding.

16. The armrest according to claim 13, wherein an inside width of the padding opening is smaller than an inside width of an opening of the depositing area.

17. The armrest according to claim 16, wherein the sliding blind is arranged in a sunken manner at a distance from an exposed surface of the padding.

18. The armrest according to claim 13, wherein the depositing area and the padding opening have an asymmetrical construction with respect to the longitudinal axis.

19. The armrest according to claim 13, wherein an inside width of an opening of the depositing area and of the padding opening are approximately equal.

20. The armrest according to claim 19, wherein a material cross-section of the padding on one of the longitudinal sides of the opening is different from that on another of the longitudinal sides.

* * * * *